J. KING.
PEDESTAL FOR SUPPORTING SHAFTING AND OTHER ROTATING PORTIONS OF MACHINERY,
AND MEANS FOR LUBRICATING THE SAME.
APPLICATION FILED JUNE 10, 1919.
1,405,226.
Patented Jan. 31, 1922.
2 SHEETS—SHEET 1.
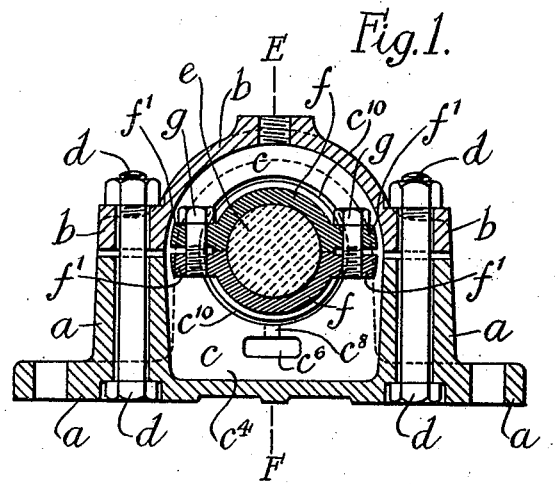
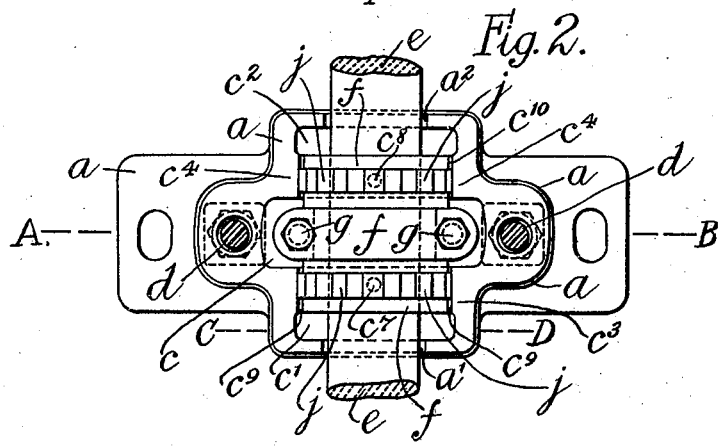
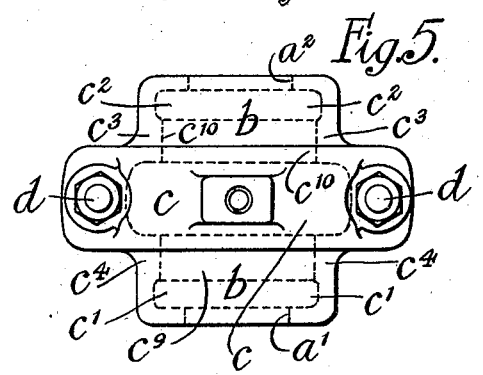

J. KING.
PEDESTAL FOR SUPPORTING SHAFTING AND OTHER ROTATING PORTIONS OF MACHINERY,
AND MEANS FOR LUBRICATING THE SAME.
APPLICATION FILED JUNE 10, 1919.
1,405,226.
Patented Jan. 31, 1922.
2 SHEETS—SHEET 2.
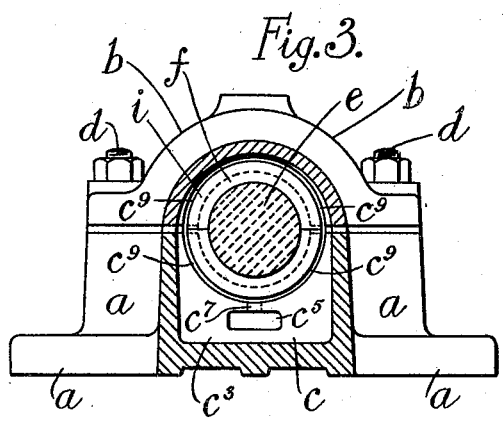
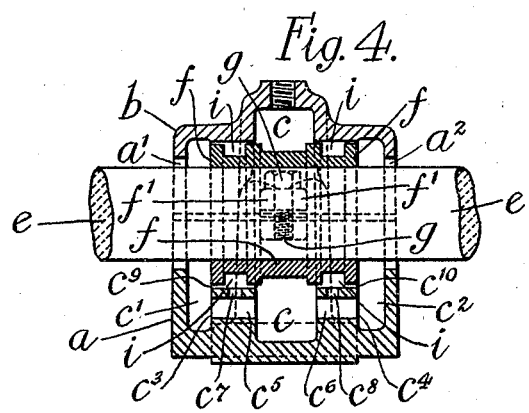
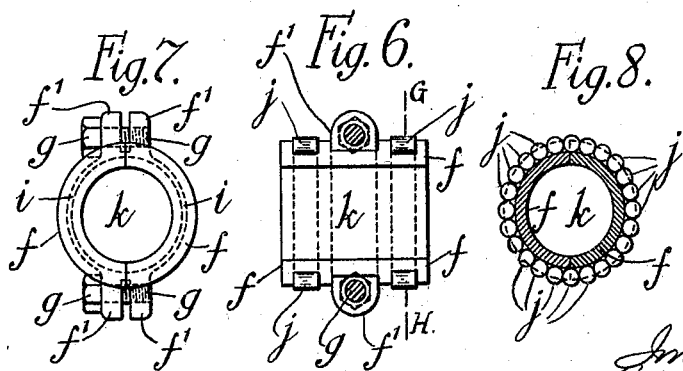

UNITED STATES PATENT OFFICE.

JOHN KING, OF LEEDS, ENGLAND.

PEDESTAL FOR SUPPORTING SHAFTING AND OTHER ROTATING PORTIONS OF MACHINERY, AND MEANS FOR LUBRICATING THE SAME.

1,405,226. Specification of Letters Patent. Patented Jan. 31, 1922.

Application filed June 10, 1919. Serial No. 303,121.

(GRANTED UNDER THE PROVISIONS OF THE ACT OF MARCH 3, 1921, 41 STAT. L., 1313.)

*To all whom it may concern:*

Be it known that I, JOHN KING, residing at Saville House, Shadwell, Leeds, in the county of York, England, have invented new and useful improvements in or relating to pedestals for supporting shafting and other rotating portions of machinery, and means for lubricating the same, (for which I have filed an application in Great Britain and Ireland, Serial No. 120,006, filed June 1, 1918,) of which the following is a specification.

This invention has reference to improvements in that type of pedestals,—preferably called paddle lubricating pedestals,—employed for supporting shafting and for rotating portions of machinery of the kind in which the lubricant, say oil, is raised by a collar, and in which means are also provided for preventing waste of the lubricant.

The object of this invention is to provide a pedestal or bearing for supporting shafting without the use of one or more bushes, the shaft being supported by means of anti-frictional rollers working in grooves formed in a sleeve fixed upon the shaft, the peripheries of the said rollers being arranged to work upon the peripheries of the circular recesses formed in the pieces or partition walls which divide the pedestal and its cap into three cavities or compartments; communication between the said compartments and the bearing surfaces of the circular recesses being by means of horizontal and vertical passages.

In this invention the lubricant is caused to be raised and to circulate on to the said bearing portions by the sleeve without any additional special arrangement of rollers or scrapers or lifting devices, such as scoops or the like, and to be returned from the collecting compartments to the well or tank portion of the pedestal instead of passing along the shaft or down the outside of the pedestal and be wasted.

In the drawings hereunto annexed are shown means for carrying the invention into practice, in which—

Fig. 1 is a longitudinal sectional elevation on line A, B, Fig. 2 of a pedestal constructed according to this invention;

Fig. 2 is a part sectional plan of Fig. 1;

Fig. 3 is a sectional elevation on line C, D, Fig. 2;

Fig. 4 a part transverse section on line E, F, Fig. 1 with the anti-frictional rollers removed;

Fig. 5 is a plan looking at the top of the cover for the pedestal shown at Fig. 1;

Fig. 6 is a part sectional elevation of the sleeve fixed to the shaft;

Fig. 7 is an end elevation of same;

Fig. 8 a section on line G, H, Fig. 6.

Like parts in all the views are marked with similar letters of reference.

$a$ and $b$ are respectively the pedestal and its cap which are of ordinary construction externally but provided with an internal cavity which is formed in three compartments $c$, $c^1$, $c^2$ of different sizes, the two outer compartments $c^1$, $c^2$ being narrower in width than the central compartment $c$. Each of the compartments is formed in the cap as well as in the main portion or body of the pedestal, and they are shaped as shown at Figs. 1 to 4. The compartments are divided by the division pieces $c^3$, $c^4$ which are of such a width as to form a bearing surface upon which the hereinafter described antifrictional rollers $j$ work. Circular openings $c^9$, $c^{10}$ are provided in the division pieces $c^3$, $c^4$ and a communication is formed between the compartments $c^1$, $c^2$ with the central compartment $c$ by means of the horizontal passages $c^5$, $c^6$ formed respectively within the division pieces $c^3$ and $c^4$. In order to lubricate the anti-frictional rollers $j$ vertical passages $c^7$, $c^8$ are formed in the division pieces $c^3$, $c^4$ and the said vertical passages communicate at their lower ends with the horizontal passages $c^5$, $c^6$.

The cap $b$ is retained ordinarily in position by bolts $d$. $e$ is the shaft upon which is fixed the sleeve $f$. The sleeve $f$ serves the double purpose, namely, for raising the lubricant and also for retaining the rollers $j$ in position. In the drawings the sleeve $f$ is shown made in two parts provided with the lugs $f^1$, $f^1$ and secured together by the set screws $g$. Although the sleeve $f$ is shown in two parts it should be distinctly understood that for large shafts it may be made in any number of parts, each portion being provided with a lug so that the parts can be secured together and the portions of the said sleeve fixed or clamped upon the shaft. The major portion of the sleeve $f$ rotates in the central portion $c$ of the cavity. In the sleeve $f$ are cut, when required, two circumferential grooves $i$, $i$ in which are inserted a number of antifrictional rollers $j$, $j$, shown more particularly at Figs. 6 and 8. The diameter of the sleeve in the portions where the circumferential grooves $i$, $i$ are cut is less in size than the hereinbefore mentioned circular holes formed in the division pieces $c^3$, $c^4$ so as to provide for the peripheries of the anti-frictional rollers $j$ being in contact with, and working upon, the inner peripheries of the said holes in the division pieces.

The holes $a^1$, $a^2$ in the outer portions $a$, $b$ of the pedestals are larger in diameter than the shaft $e$. The central hole in the sleeve $k$ is made of such a diameter that the sleeve when clamped upon the shaft will be held tightly thereon.

The action of the apparatus is as follows:—

Oil or other lubricant is placed in the compartment $c$, $c^1$, $c^2$ to the required height, say, to any suitable level below the shaft $e$, and by means of the passages $c^5$, $c^6$, $c^7$, $c^8$ the oil will circulate from one compartment to the other and also to the circumferential grooves $i$ and anti-frictional rollers $j$ placed therein. As the shaft revolves the lugs $f^1$ on the sleeve $f$ form agitators for agitating the oil and for lifting it up on to the outer periphery of the sleeve and for lubricating the rollers and bearing portions of the sleeve. At the same time by arranging the smaller compartments $c^1$, $c^2$ beyond the ends of the sleeve provision is made for collecting the oil in the pedestals and for preventing it from passing through the circular openings $a^1$, $a^2$ in the pedestal itself; the passages $c^5$, and $c^6$ permit of the oil or other lubricant to return to the larger and central compartment $c$, thus saving the waste of oil that frequently takes place when an ordinary and constant dripping lubricator is employed.

By constructing pedestals as herein described with the central cavities, the use of brass and other bushes is avoided, and provision is made by providing the sleeve with the central recesses and allowing the anti-frictional rollers $j$ to rotate in the circular holes $c^9$ and $c^{10}$ of the division pieces $c^3$, $c^4$ for the steady running of the shaft and for the bearing portions thereof to be self-contained and within the central portions of the pedestal.

It will readily be understood that when anti-frictional rollers $j$ are dispensed with then the portions of the sleeve in which the circumferential grooves $i$ are cut will be made to fit so as to rotate freely within the holes $c^9$ and $c^{10}$.

Pedestals constructed as herein described may be used with hangers of any suitable construction and also mounted upon supporting frames as well as for use upon machines or frames where ordinary pedestals are employed.

What I claim is:—

1. A pedestal for supporting shafts and other parts of machinery having a main portion divided into three compartments, a cap for the said main portion provided with a corresponding number of compartments, the said compartments in both the main portion and the cap being of different sizes, the division pieces which separate the compartments being of a width to form bearing surfaces, and having circular openings and horizontal and vertical communication passages, formed therein, anti-frictional rollers mounted on said bearing surface which support the rotating shaft, said shaft having a sleeve made in parts fixed thereon and provided with lugs, as set forth.

2. In a pedestal for supporting shafting the combination of a main portion and a cap, each divided into three compartments therein and having circular openings and horizontal and vertical communication passages formed in the division pieces between the compartments, anti-frictional rollers for supporting the shaft arranged to work in said circular openings, a shaft mounted upon said rollers, a sleeve mounted upon the shaft and made in a number of parts and provided with lugs by which the parts are bolted together, the sleeve having circumferential grooves formed in the periphery of the sleeve for the reception of the anti-frictional rollers, as and for the purposes set forth.

3. In a shaft support, the combination of a pedestal comprising a base portion, divided into three compartments by parallel partitions, and a cap portion, a sleeve adapted to be clamped about a shaft and provided with two circumferential grooves adapted to register with the partitions in the said base, and a series of antifriction rollers arranged in each said groove and bearing upon said partitions, for the purpose described.

4. In a shaft support, the combination of a pedestal comprising a base portion, divided into three compartments by parallel partitions, and a cap portion, each of said partitions having passages formed therethrough for connecting the several compartments and lubricant ducts extending from said passages to the upper faces of the partitions, a sleeve adapted to be clamped about a shaft and provided with two circumferential grooves adapted to register with the partitions in the said base, and a series of antifrictional rollers arranged in each said groove and bearing upon said partitions, for the purpose described.

JOHN KING.

Witnesses:
W. FAIRBURN HART,
ALICE M. TURNER.